US011128113B2

(12) United States Patent
Martínez Ramos et al.

(10) Patent No.: US 11,128,113 B2
(45) Date of Patent: Sep. 21, 2021

(54) CONNECTION DEVICE FOR CONNECTING MESH CABLE TRAYS AND MESH CABLE TRAY SECTION

(71) Applicant: PEMSA CABLE MANAGEMENT, S.A., Alcalá de Henares (ES)

(72) Inventors: Juan José Martínez Ramos, Alcalá de Henares (ES); Carlos Domínguez Rodríguez, Alcalá de Henares (ES)

(73) Assignee: PEMSA CABLE MANAGEMENT, S.A., Alcalá de Henares (ES)

(*) Notice: Subject to any disclaimer, the term of this patent is extended or adjusted under 35 U.S.C. 154(b) by 0 days.

(21) Appl. No.: 16/760,888

(22) PCT Filed: Nov. 6, 2018

(86) PCT No.: PCT/ES2018/070717
§ 371 (c)(1),
(2) Date: Apr. 30, 2020

(87) PCT Pub. No.: WO2019/086746
PCT Pub. Date: May 9, 2019

(65) Prior Publication Data
US 2021/0184441 A1 Jun. 17, 2021

(30) Foreign Application Priority Data
Nov. 6, 2017 (ES) .............. ES201731345U

(51) Int. Cl.
*H02G 3/06* (2006.01)
*H02G 3/00* (2006.01)
(52) U.S. Cl.
CPC ......... *H02G 3/0608* (2013.01); *H02G 3/0691* (2013.01); *H02G 3/263* (2013.01)

(58) Field of Classification Search
CPC .... H02G 3/0608; H02G 3/0691; H02G 3/263; H02G 3/0616; H02G 3/00; H02G 3/02;
(Continued)

(56) References Cited

FOREIGN PATENT DOCUMENTS

DE 19742095 C1 4/1999
EP 1793464 A1 6/2007
(Continued)

OTHER PUBLICATIONS

International Search Report for PCT/ES2018/070717, dated Apr. 29, 2019.

*Primary Examiner* — Angel R Estrada
(74) *Attorney, Agent, or Firm* — Merchant & Gould P.C.

(57) ABSTRACT

A connection device connects mesh cable trays and mesh cable tray section. The trays include longitudinal and transverse rods joined together. The connection device includes two side parts connected by a central connection section. The central connection section includes an intermediate section and two grooved sections. Each grooved section is disposed on one side of the intermediate section. The height of the central connection piece is greater than the distance between two consecutive longitudinal rods of the cable. The central connection piece has s recess for housing a longitudinal rod of the cable tray. One grooved section has an outer side surface with a wedge-shaped upper section, a central section wherefrom a connection device side part projects laterally, and a lower section below the recess housing the longitudinal rod. The other grooved section projects laterally from the other side part, connecting the side part and the other grooved section.

4 Claims, 5 Drawing Sheets

(58) Field of Classification Search
CPC ...... H02G 3/22; H02G 3/0443; H02G 3/0437; H02G 3/0431; H02G 3/04; F16L 5/00; F16L 3/26
USPC ...... 174/97, 480, 68.1, 68.3, 72 R, 88 R, 95, 174/96, 135, 60, 70 C; 248/68.1, 73, 49, 248/74.1, 74.2; 403/326, 327, 329; 211/119, 26, 13.1, 181.1
See application file for complete search history.

(56) References Cited

FOREIGN PATENT DOCUMENTS

| | | | |
|---|---|---|---|
| ES | 2066167 | T3 | 3/1995 |
| ES | 2093949 | T3 | 1/1997 |
| ES | 2122829 | A1 | 12/1998 |
| ES | 2159099 | T3 | 9/2001 |
| ES | 1060632 | U | 10/2005 |
| ES | 1071273 | U | 2/2010 |
| ES | 2370570 | A1 | 12/2011 |
| ES | 2518741 | A1 | 11/2014 |
| WO | 2012/104545 | A1 | 8/2012 |

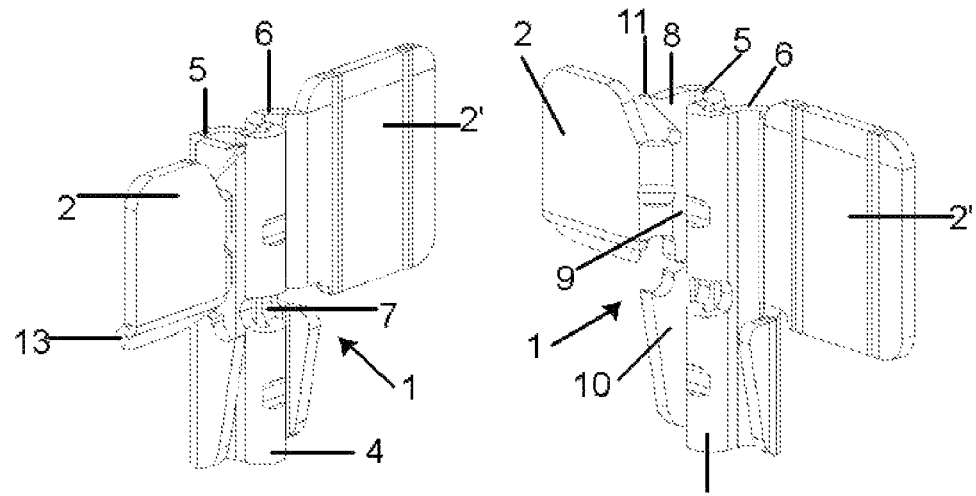
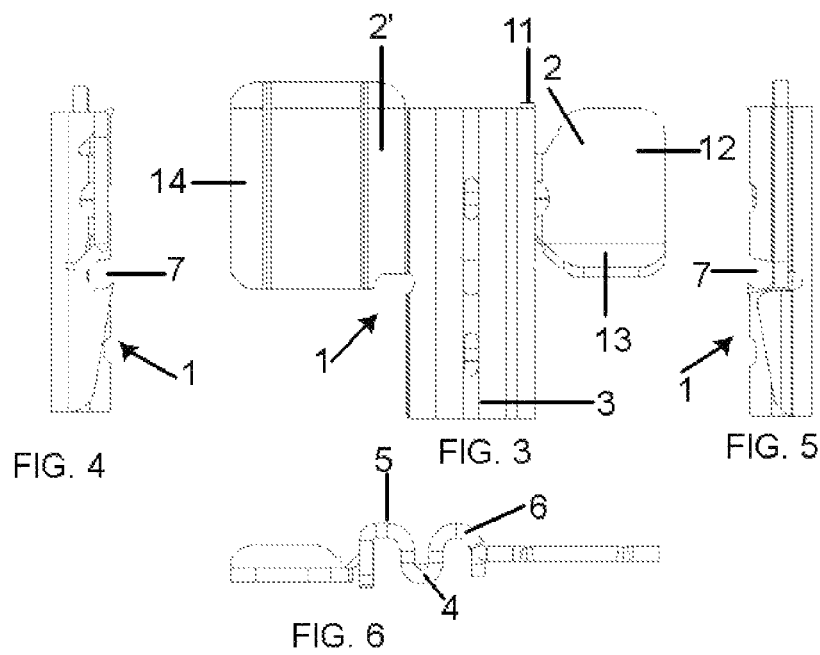

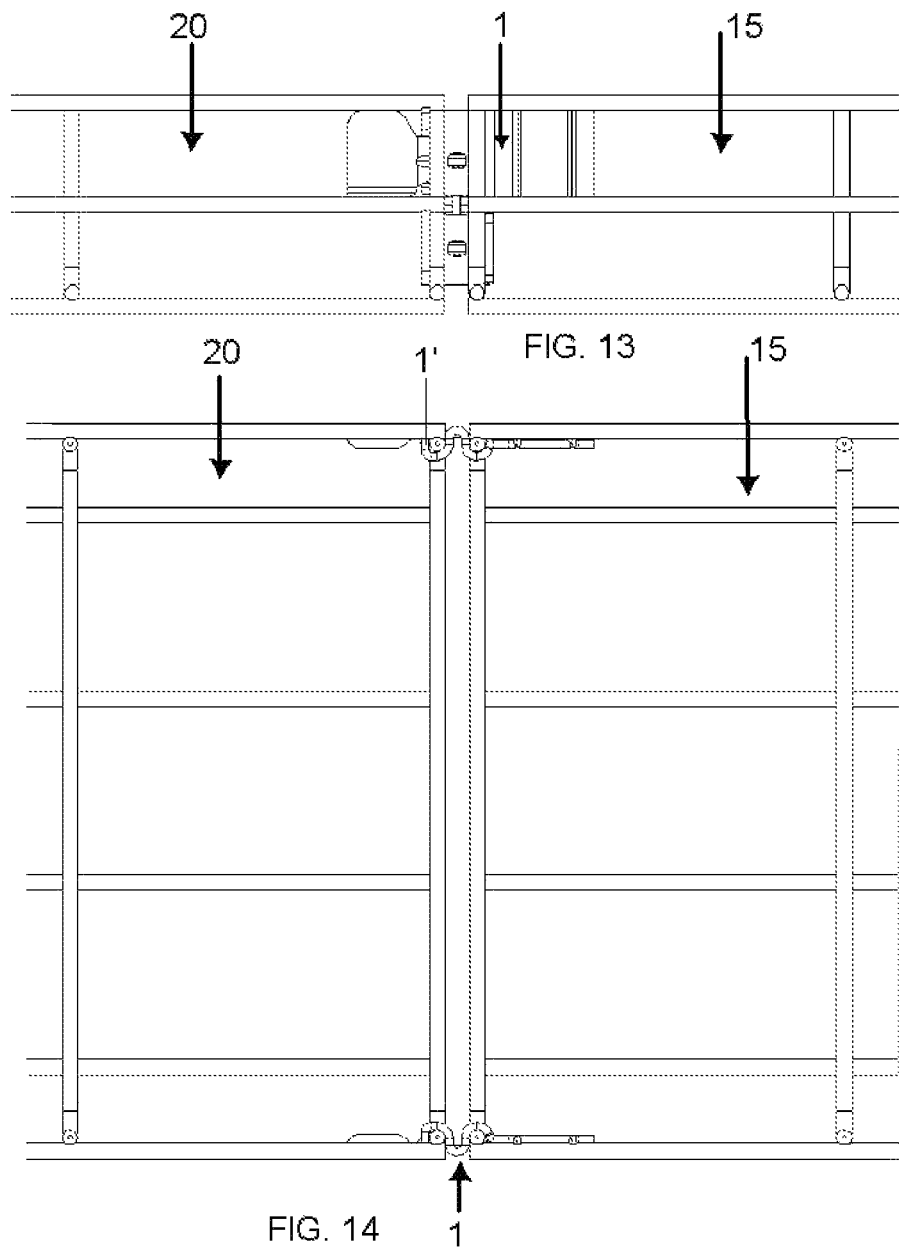

CONNECTION DEVICE FOR CONNECTING MESH CABLE TRAYS AND MESH CABLE TRAY SECTION

This application is a National Stage Application of PCT/ES2018/070717, filed Nov. 6, 2018, which claims benefit of Spanish Patent Application No. U201731345, filed Nov. 6, 2017, and which applications are incorporated herein by reference. To the extent appropriate, a claim of priority is made to each of the above-disclosed applications.

FIELD OF THE INVENTION

The present invention relates to a connection device for connecting mesh cable trays of the type used in electrical installations, wherein the object of the device is to connect the ends of the consecutive sections of the mesh cable trays used mainly to support electric cables. The invention also relates to a section of a mesh cable tray comprising said device.

BACKGROUND OF THE INVENTION

Traditionally, screwed connections have been used to connect consecutive sections of mesh cable trays. Furthermore, multiple systems have been developed in the prior art that serve to connect consecutive sections of mesh cable trays which avoid the use of said screwed connections.

ES 2093949 T3 relates to a cable duct section in the form of a tray or conduit replaced by an asymmetric module having two complementary ends, each of which forming a reversible interlock coupling element, wherein a first coupling element consists of at least one connector or connecting piece whose proximal end is welded to said tray and whose distal end has a coupling claw, wherein the second coupling element is formed in at least one portion of said tray and being susceptible of receiving said coupling claw.

ES 2159099 T3 closes a trunking clamp for connecting cable support sections, longitudinally divided into two branches, wherein each branch has fastening means that enable it to be irremovable fixed in the area of the end of a first section and in the area of the end of a second section, respectively. The fastening means for fixing the first branch are independent from those of the second branch and make it possible to fix the clamp solely with the first section. The fastening means for fixing the second branch in the second section include at least one elastic interlocking means ready to cooperate with a transverse wire of the second section subsequent to fixing the two sections.01.

ES 2066167 T3 discloses a clamp for a welded wire cable raceway of the type including at least two projecting folding tabs, longitudinally elongated at a distance from each other, and each of which is appropriate for being fixed by crimping on a transverse wire of one of the two cable raceway sections that must be butt coupled, wherein each of the folding tabs is disposed level with an appropriate hollowing for folding thereof. The clamp of this invention requires a screwdriver or specific tool to facilitate the installation thereof.

ES 2122829 A1, which relates to a clamp for connecting or assembling sections or branches of cable raceways disposed end-to-end, discloses a piece consisting of a metal band having a rigid central portion and two elastic end zones having a fixing fold for applying around a transverse metal wire of a cable raceway section, comprising at least one longitudinal fold suitable for coming into contact on two longitudinal wires in prolongation of each other, which belong to the two cable duct sections, said longitudinal fold comprising two different sections with opening lines oriented in opposite directions, one towards the interior of the cable raceway and the other towards the exterior of the cable raceway. This clamp requires a tool to reach its locking position.

ES 2518741 A1 relates to a connection piece for connecting mesh tray sections, wherein the mesh tray sections consist of longitudinal and transverse rods joined together, consisting of a plate with ends susceptible of being coupled to the transverse rods, wherein the height of the ends is lower than the distance between the two consecutive longitudinal rods where between the connection piece is housed. One of the ends of the piece comprises two extensions curved towards the same side and, between them, an extension curved towards the opposite side, and the other end comprises an undulated zone having at least two semi-waves, each of which is susceptible of housing a transverse rod.

ES 1071273 U relates to a quick-connect device for mesh cable trays, consisting of a piece with two halves connected by means of a central connection piece, said piece comprising two grooved sections connected by an intermediate section, wherein each of said halves of a central plate that continues along the top and bottom by means of corresponding arched extensions, wherein the central plate of each of said halves additionally comprises an inner side extension which is connected to the respective grooved section, such that said extension has at least one cantilevered tab with its base nearer the grooved section than its free end edge, and wherein the upper and lower extensions of each central plate are arched in opposite directions.

ES 2370570 A1, which relates to a "stapling system for connecting mesh cable duct sections", discloses staples for connecting cable duct sections which press-fitted in the vertical and horizontal branches of the U-shaped wire rods on contiguous section ends. The staples are envisaged to be generally W-shaped with respective longitudinal grooves for fitting in the wire rods; with a respective central portion that connects said grooves and that forms a respective protuberance; and with respective flap sections extending from the outer edges of the grooves and that can be folded inwards around the U-shaped wire rods of the cable duct. Pursuant to one variant, the staples may be joined together, forming a single piece, by a strip-shaped connection that can be bent at an angle of 90°; additionally, the connection can be cut for individual use of the staples.

Although the devices of the prior art facilitate the process for quickly connecting mesh cable trays, it is preferable to have a simpler device that will enable easier and quicker coupling.

SUMMARY OF THE INVENTION

Thus, the object of the present invention is to provide a simple connection device for connecting mesh cable trays that will make it possible to obtain an easier and quicker fixation of said trays.

The invention provides a connection device for connecting mesh cable trays consisting of a piece comprising two side parts connected by means of a central connection piece, said central connection piece comprising an intermediate section and two grooved sections, wherein each of the grooved sections is disposed on one side of the intermediate section, wherein the height of the central connection piece is greater than the distance between two consecutive longitudinal rods of the cable tray whereon the connection device is disposed, wherein the central connection piece has at least one recess for housing a longitudinal rod of the cable tray whereon the connection device is intended to be disposed, wherein one of the grooved sections has an outer side surface with three sections: a wedged-shaped upper section ending in an upper point which is bent upwards, a central section wherefrom one of the side parts of the connection device projects and a lower section disposed beneath the recess for housing the longitudinal rod of the cable tray, and wherein the other side part projects laterally from the other grooved section, wherein the connection between the side part and the other grooved section disposed above the recess for housing a longitudinal rod of the cable tray whereon the connection device is intended to be disposed.

The invention also provides a mesh cable tray section comprising said connection devices.

This configuration of the connection device makes it possible to achieve a quick, simple and safe onsite connection.

Another advantage of the invention is that no tool is required for on-site assembly.

Other features and advantages of the present invention shall be inferred from the following detailed description of illustrative embodiments of its object in relation to the accompanying figures.

BRIEF DESCRIPTION OF THE DRAWINGS

What follows is a non-limiting illustration of the object of the present invention, making reference to the accompanying drawings, wherein:

FIG. 1 shows a perspective view of an embodiment of the connection device of the invention.

FIG. 2 shows another perspective view of the embodiment of the connection device of the invention of FIG. 1.

FIG. 3 shows a front view of the embodiment of the connection device of the invention of FIG. 1.

FIG. 4 shows a side view of the embodiment of the connection device of the invention of FIG. 1.

FIG. 5 shows another side view of the embodiment of the connection device of the invention of FIG. 1.

FIG. 6 shows a plan view of the embodiment of the connection device of the invention of FIG. 1.

FIG. 13 shows a side view of FIG. 12.

FIG. 14 shows a plan view of FIG. 12.

DETAILED DESCRIPTION OF THE INVENTION

Figure 7:
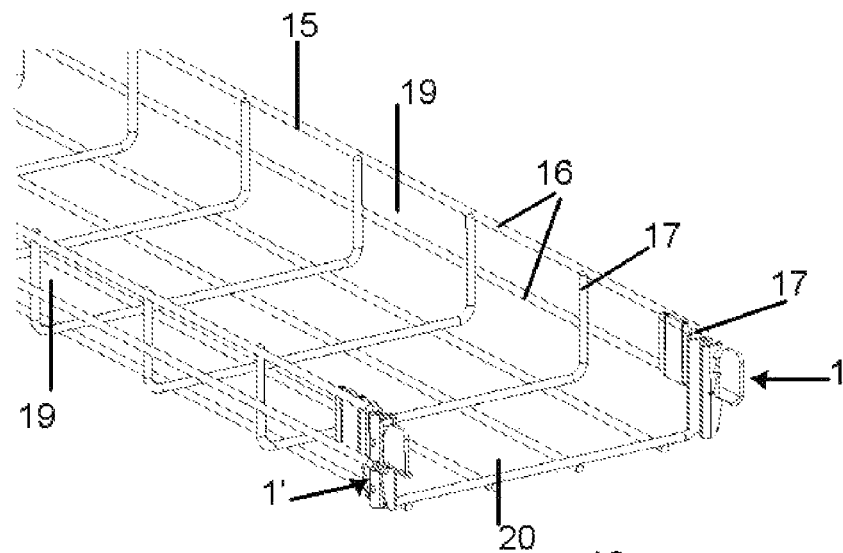
FIG. 7 shows a perspective view of a tray section with two connection devices of the invention.
Figure 8:
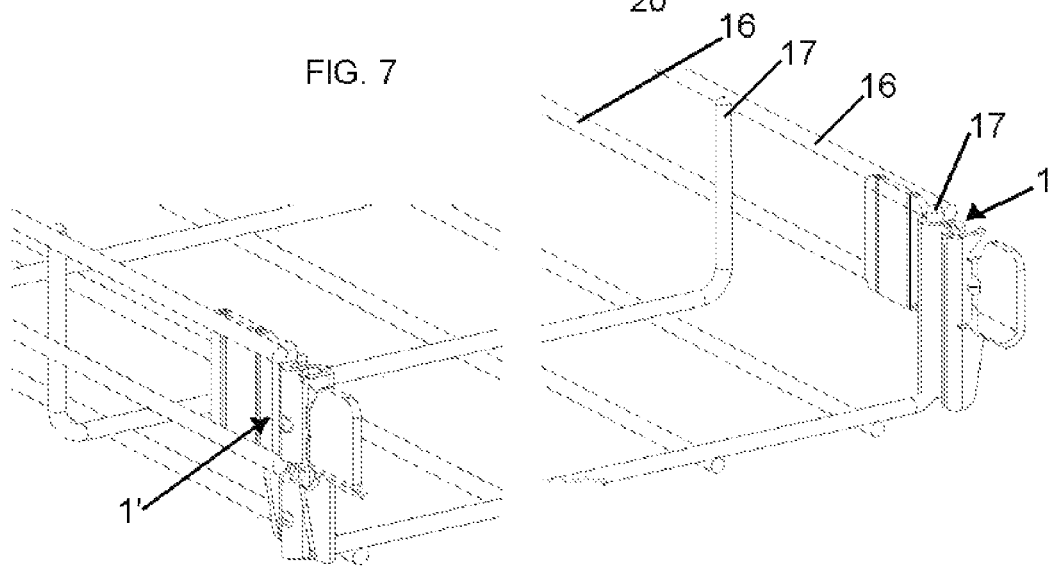
FIG. 8 shows a detailed view of FIG. 7.
Figure 9:
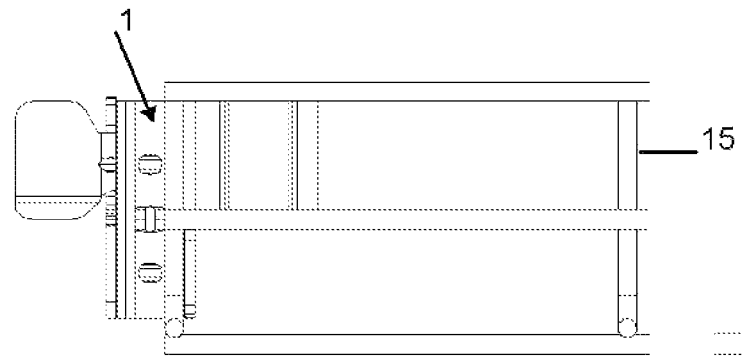
FIG. 9 shows an exterior view of a cable tray section with a connection device of the invention.
Figure 10:
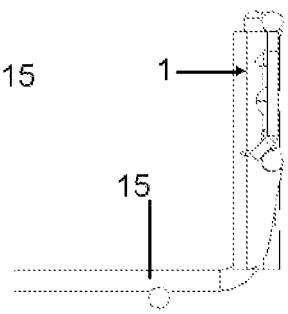
FIG. 10 shows a front view of a cable tray section with a connection device of the invention.
Figure 11:
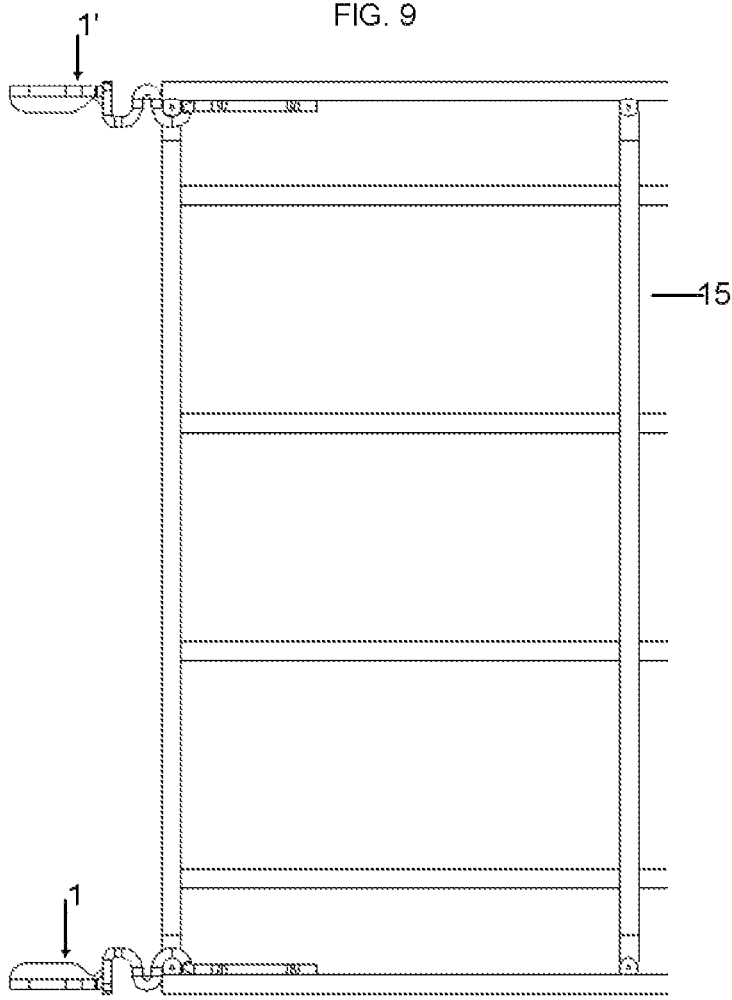
FIG. 11 shows a plan view of the tray section with two connection devices of the invention of FIG. 7.

FIGS. 1 to 6 show several views of an embodiment of the connection device 1 of the invention, specially designed for connecting mesh cable trays by their ends, said cable trays consisting of longitudinal 16 and transverse 17 rods joined together.

In said figures it can be observed that the connection device 1 of the invention consists of a piece comprising two side parts 2, 2' connected by means of a central connection piece 3. The central connection piece 3 comprises an intermediate section 4 and two grooved sections 5, 6, wherein each of the grooved sections 5, 6 is disposed on one side of the intermediate section 4. The height of the central connection piece 3 is greater than the distance between two consecutive longitudinal rods 16 of the cable tray whereon the connection device 1 is intended to be disposed, and also has at least one recess 7 for housing a longitudinal rod 16 of the cable tray whereon the connection device 1 is intended to be disposed. One of the grooved sections 5 of the central part 3 has an outer lateral surface with three sections: a wedge-shaped upper section 8 ending in an upper point 11 which is bent upwards, a central section 9 wherefrom one of the side parts 2 of the connection device 1 projects laterally and a lower section 10 disposed below the recess 7 for housing the longitudinal rod 16 of the cable tray. The other side part 2' projects laterally from the other grooved section 6, being the connection between the side part 2' and the other grooved section 6 disposed above the recess 7 for housing a longitudinal rod 16 of the cable tray whereon the connection device 1 is intended to be disposed.

FIGS. 7 to 11 show several views of a cable tray section 15 with two connection devices 1 of the invention.

In one embodiment of the invention, one of the side parts 2' comprises a plate 14 whose height corresponds to the distance between two consecutive longitudinal rods 16 of the cable tray whereon the connection device 1 is intended to be disposed, plus the diameters of said longitudinal rods 16, and the other side part 2 comprises a plate 12 whose height is lower than the distance between two consecutive longitudinal rods 16 of the cable tray whereon the connection device 1 is intended to be disposed, from the bottom of which an inclined extension 13 projects which is intended to be disposed, in a mounted position, on a longitudinal rod 16 of the cable tray whereon the connection device 1 is intended to be disposed.

The mesh tray section 15 of FIGS. 7 to 11 can be supplied as an assembly pre-assembled in-factory having one or two symmetrical connection devices 1, 1' on one of its ends for coupling to another mesh tray section (in the event of having two connection devices 1, 1', each tray side would include a device, as in FIG. 7).

Furthermore, the mesh tray section 15 can also be supplied as an assembly pre-assembled in-factory having three connection devices on one of its ends for coupling to another mesh tray section, wherein a connection device is coupled to the base 18 of the mesh tray section 15.

The mesh cable tray section 15 of FIGS. 7 to 11 has a general basic configuration comprising longitudinal rods 16 and transverse rods 17 joined together, the transverse rods 17 being U-shaped such as to form a base 18 and two sides 19, with longitudinal rods 16 disposed on the base 18 and the sides 19 of the tray, whereto the connection devices 1, 1' of the invention are incorporated.

Alternatively, the tray sections with incorporated connection devices can also be assembled on-site manually by coupling the connection device or devices to the tray on-site.

Figure 12:
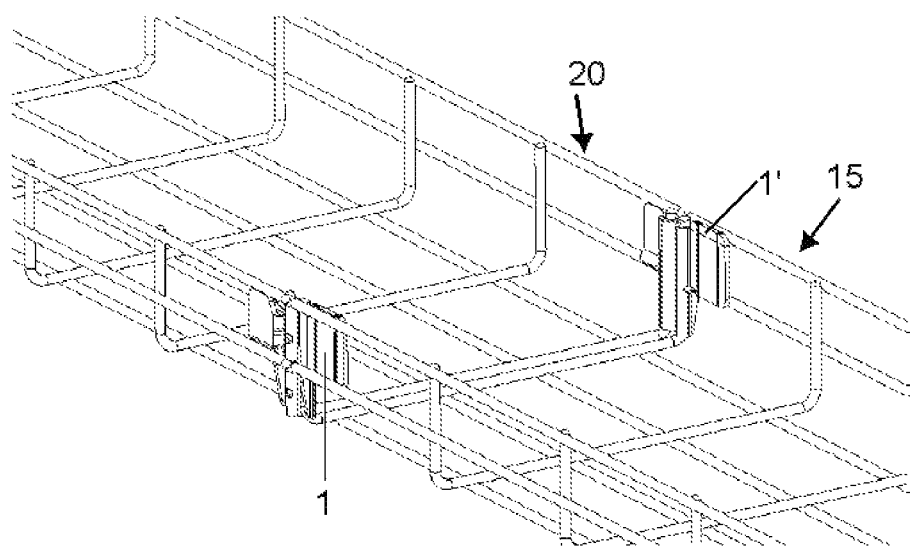
FIG. 12 shows a perspective view of two connection devices of the invention coupled on two cable tray sections.

In the tray sections 15 with incorporated connection devices 1, a side part 2' of the connection device 1 is fixed to two consecutive longitudinal rods 16 (for example, by welding) and one of the grooved sections 6 of the central part 3 of the connection device 1 enfolds the corresponding end transverse rod 17. In this manner, the intermediate section 4 and the other grooved section 5 of the central part 3 of the connection device 1 would be cantilevered, together with the other side part 2 of the connection device 1. On coupling this cable tray section 15 with connection devices 1 incorporated with another cable tray section 20 (that previously installed) on-site, the first section 15 (that incorporating connection devices 1) would be coupled to the other section 20 from above, fitting the end transverse rod 17 of the section 20 into the corresponding grooved section 5, whereupon the corresponding longitudinal rods 16 are retained by the upper point 11 of the wedge-shaped section 8 of the outer lateral surface of the corresponding grooved section 5, by the recess 7 envisaged in the connection device 1 for housing longitudinal rods 16 and by the inclined extension 13 of the side part 2, where applicable. Said arrangement is illustrated in FIGS. 12 to 14, which represent several views of two connection devices 1, 1' of the invention coupled on two cable tray sections 15, 20.

The modifications comprised within the scope defined by the following claims can be made to the preferred embodiments of the invention described above.

The invention claimed is:

1. A connection device for connecting mesh cable trays having longitudinal and transverse rods joined together, including a piece comprising two side parts connected by a central connection piece, wherein the central connection piece comprises an intermediate section and two grooved sections wherein each of the grooved sections is disposed on one side of the intermediate section, a height of the central connection piece being greater than a distance between two consecutive longitudinal rods of the cable trays whereon the connection device is to be disposed, the central connection piece having at least one recess for housing a longitudinal rod of the cable tray whereon the connection device is intended to be disposed, wherein one of the grooved sections has an outer side surface with three sections: a wedge-shaped upper section ending in an upward bent upper point, a central section wherefrom one of the side parts of the connection device projects laterally and a lower section disposed below the recess for housing the longitudinal rod of the cable tray, wherein the other grooved section projects laterally from the other side part connecting the side part and the other grooved section disposed above the recess for housing the longitudinal rod of the cable tray whereon the connection device is to be disposed, and wherein one of the side parts comprises a plate having a height corresponding to the distance between two consecutive longitudinal rods of the cable tray whereon the connection device is to be disposed, plus diameters of said longitudinal rods, and the other side part comprises a plate having a height lower than the distance between two consecutive longitudinal rods of the cable trays whereon the connection device is to be disposed, from the bottom of which an inclined extension projects, in a mounted position, on a longitudinal rod of the cable tray whereon the connection device is to be disposed.

2. A mesh cable tray section, comprising longitudinal rods and transverse rods joined together, said transverse rods being U-shaped, wherein the transverse rods form a base and two sides (19), with the longitudinal rods disposed on the base and sides of the tray; and at least one connection device for connecting mesh cable trays according to claim 1, wherein the side part of the connection device is fixed to two consecutive longitudinal rods and one of the grooved sections of the central part of the connection device enfolds a corresponding end transverse rod.

3. A mesh cable tray section according to claim 2, comprising two symmetrical connection devices for mesh cable trays, each of which coupled on a side of the mesh cable tray section.

4. A mesh cable tray section, according to claim 3, further comprising a connection device for connecting mesh cable tray sections coupled on the base of the mesh cable tray section.

\* \* \* \* \*